(12) United States Patent
Ayichew

(10) Patent No.: US 10,088,850 B2
(45) Date of Patent: Oct. 2, 2018

(54) BRAKE PRESSURE REDUCER VALVE WITH INPUT PRESSURE CHANGE COMPENSATION

(71) Applicant: GOODRICH CORPORATION, Charlotte, NC (US)

(72) Inventor: Efrem E. Ayichew, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 79 days.

(21) Appl. No.: 15/415,598

(22) Filed: Jan. 25, 2017

(65) Prior Publication Data
US 2018/0210472 A1 Jul. 26, 2018

(51) Int. Cl.
| | | |
|---|---|---|
| G05D 16/06 | (2006.01) | |
| B60T 13/14 | (2006.01) | |
| B60T 15/36 | (2006.01) | |
| B60T 11/34 | (2006.01) | |

(52) U.S. Cl.
CPC .......... *G05D 16/0669* (2013.01); *B60T 11/34* (2013.01); *B60T 13/148* (2013.01); *B60T 15/36* (2013.01)

(58) Field of Classification Search
CPC ..... G05D 16/066; B60T 11/34; B60T 13/148; B60T 15/36; Y10T 137/8671
USPC .......... 244/110 A, 111, 110 H; 303/155, 126
See application file for complete search history.

(56) References Cited

U.S. PATENT DOCUMENTS 2,973,013 A * 2/1961 Myers ........................ F15B 9/17
137/625.62
3,273,468 A * 9/1966 Allen ....................... F15B 13/01
137/596.2
3,477,478 A * 11/1969 Robertson ................. G01N 1/18
141/130
3,592,234 A * 7/1971 Baltus ................. F15B 13/0438
137/625.62
3,841,608 A * 10/1974 Schmitt .................... B66D 1/44
137/625.69

(Continued)

FOREIGN PATENT DOCUMENTS

| EP | 0296342 | 12/1988 |
| GB | 2017851 | 10/1979 |

(Continued)

OTHER PUBLICATIONS

European Patent Office, European Search Report dated May 30, 2018 in Application No. 18152610.4-1012.

*Primary Examiner* — Jessica Cahill

(57) ABSTRACT

A pressure reducer valve includes a first chamber having a first spring and a first volume for receiving an output fluid having an actual output pressure that equals the desired output pressure in response to the pressure reducer valve achieving equilibrium and a second chamber having a second spring and a second volume for receiving a return fluid having a return pressure that is less than the desired output pressure and the input pressure of an input fluid. The pressure reducer valve further includes a main shaft exposed to the first spring and the output fluid from the first chamber and the second spring and the return fluid from the second chamber such that the main shaft may move relative to the first chamber and the second chamber based on forces applied by the first spring, the output fluid, the second spring, and the return fluid.

15 Claims, 4 Drawing Sheets

(56) References Cited

U.S. PATENT DOCUMENTS

| | | | | |
|---|---|---|---|---|
| 4,254,688 | A | * | 3/1981 | Richter ................... F15B 13/16 |
| | | | | 91/359 |
| 4,294,287 | A | * | 10/1981 | Boswell ................ F16H 59/045 |
| | | | | 137/625.69 |
| 4,708,405 | A | * | 11/1987 | Belart ..................... B60T 8/446 |
| | | | | 303/114.1 |
| 4,720,151 | A | * | 1/1988 | Belart ..................... B60T 8/445 |
| | | | | 188/345 |
| 4,895,416 | A | * | 1/1990 | Tozu ..................... B60T 8/4036 |
| | | | | 303/116.1 |
| 5,497,804 | A | * | 3/1996 | Codina ............... F15B 13/0402 |
| | | | | 137/554 |
| 8,393,571 | B2 | | 3/2013 | Miller |
| 8,418,722 | B2 | | 4/2013 | Grancher |
| 8,926,027 | B2 | * | 1/2015 | Shimada ................. B60T 7/042 |
| | | | | 303/10 |
| 2004/0089355 | A1 | * | 5/2004 | Nirasawa ............... G05D 16/18 |
| | | | | 137/625.69 |
| 2016/0052498 | A1 | * | 2/2016 | Isono ..................... B60T 7/042 |
| | | | | 303/115.2 |

FOREIGN PATENT DOCUMENTS

| | | |
|---|---|---|
| GB | 2025550 | 1/1980 |
| JP | S613769 | 1/1986 |

\* cited by examiner

BRAKE PRESSURE REDUCER VALVE WITH INPUT PRESSURE CHANGE COMPENSATION

FIELD

The present disclosure relates to valves for use in aircraft brakes and, in particular, to pressure reducing valves usable to reduce a pressure in a portion of an aircraft brake.

BACKGROUND

Many aircraft use hydraulic power to articulate various flight controls and landing gear system components. Relatively great hydraulic pressure may be utilized to control small hydraulic actuators. While it may be convenient to use higher pressure for relatively great hydraulic loads, it may be desirable in some situations to reduce a pressure of the hydraulic fluid to operate other components that may be rated for usage at lower pressure. In that regard, aircraft brakes may include a pressure reducing valve for performing such pressure reduction.

SUMMARY

A pressure reducer valve according to various embodiments may be used to convert an input pressure to a desired output pressure that is less than the input pressure. The pressure reducer valve includes a first chamber having a first spring and a first volume for receiving an output fluid having an actual output pressure that equals the desired output pressure in response to the pressure reducer valve achieving equilibrium. The pressure reducer valve further includes a second chamber having a second spring and a second volume for receiving a return fluid having a return pressure that is less than the desired output pressure and the input pressure of input fluid. The pressure reducer valve further includes a main shaft exposed to the first spring and the output fluid from the first chamber and the second spring and the return fluid from the second chamber such that the main shaft may move relative to the first chamber and the second chamber based on forces applied by the first spring, the output fluid, the second spring, and the return fluid.

In any of the foregoing embodiments, the main shaft further includes a first passageway configured to be in fluid communication with the input fluid and a second passageway configured to be in fluid communication with the return fluid, the main shaft is configured to move relative to the first chamber and the second chamber to allow the first volume to receive at least a portion of the input fluid to increase the actual output pressure in response to the actual output pressure being less than the desired output pressure, and the main shaft is configured to move relative to the first chamber and the second chamber to allow the second volume to receive at least a portion of the output fluid to decrease the actual output pressure in response to the actual output pressure being greater than the desired output pressure.

Any of the foregoing embodiments may also include a third chamber having a third spring and a third volume for receiving the output fluid, and a piston at least partially positioned within the third chamber and subjected to the third spring and the output fluid such that the input fluid or the return fluid may flow into the first volume at a first rate in response to the actual output pressure being between a low output pressure threshold and a high output pressure threshold, and the input fluid or the return fluid may flow into the first volume at a second rate that is greater than the first rate in response to the actual output pressure being less than the low output pressure threshold or greater than the high output pressure threshold.

Any of the foregoing embodiments may also include a ramping chamber having a ramping spring, a first ramping volume configured to receive the input fluid at a first flow rate, and a second ramping volume configured to receive the input fluid at a second flow rate that is greater than the first flow rate, and a ramping shaft at least partially positioned within the ramping chamber, coupled to the second spring, and subjected to pressure from the first ramping volume, the second ramping volume, and the ramping spring such that the ramping shaft actuates the main shaft to reduce a rate of input fluid flow into the first volume in response to a relatively large increase of the input pressure.

Any of the foregoing embodiments may also include a first ramping plate positioned on a first side of the ramping spring and a second ramping plate positioned on a second side of the ramping spring, and in any of the foregoing embodiments, the first ramping plate is exposed to the first ramping volume, the second ramping plate is exposed to the second ramping volume, and the ramping shaft includes a center plate positioned along and coupled to the ramping spring such that the ramping shaft is subjected to the pressure from the first ramping volume via the first ramping plate and the ramping spring, and is subjected to the pressure from the second ramping volume via the second ramping plate and the ramping spring.

Any of the foregoing embodiments may also include a backup release stage configured to allow the output fluid to flow through the backup release stage to the second volume to be the return fluid in order to reduce the actual output pressure of the output fluid in response to the actual output pressure being greater than a threshold output pressure.

In any of the foregoing embodiments, the backup release stage includes a first release valve and a second release valve, the first release valve being in fluid communication with the output fluid and the second release valve, and the second release valve being in fluid communication with the first release valve and the second volume such that the output fluid may flow through the first release valve and the second release valve to the second volume in response to the actual output pressure being greater than the threshold output pressure.

Any of the foregoing embodiments may also include a recovery stage configured to allow the output fluid to flow through the recovery stage in order to convert the output fluid into the input fluid to conserve hydraulic fluid in the pressure reducer valve in response to a difference between the actual output pressure and the input pressure being greater than a predetermined pressure.

In any of the foregoing embodiments, the recovery stage includes a first recovery valve and a second recovery valve, the first recovery valve being in fluid communication with the output fluid and the second recovery valve, and the second recovery valve being in fluid communication with the first recovery valve and the input fluid such that the output fluid may flow through the first recovery valve and the second recovery valve in order to convert the output fluid into the input fluid in response to the difference between the actual output pressure and the input pressure being greater than the predetermined pressure.

Any of the foregoing embodiments may also include a manual release stage having a release lever configured to allow the output fluid to flow therethrough in response to manual actuation of the release lever and a manual release chamber. The manual release chamber may include an output volume configured to be in fluid communication with the output fluid in response to the manual actuation of the release lever, a return volume in fluid communication with the return fluid, and a first metering channel and a second metering channel each extending from the output volume to the return volume and configured to allow the output fluid to flow to the return volume in order to become the return fluid at a metered rate of flow.

Also described is a pressure reducer valve in accordance with various embodiments that can convert an input pressure to a desired output pressure that is less than the input pressure. The pressure reducer valve includes a primary regulation stage in fluid communication with an input fluid having the input pressure, a return fluid having a return pressure that is less than the input pressure and the desired output pressure, and an output fluid having an actual output pressure and configured to convert at least a portion of the input pressure into the actual output pressure such that the actual output pressure approaches the desired output pressure. The pressure reducer valve further includes a slow ramp-up stage coupled to the primary regulation stage and configured to reduce a rate of pressure transfer from the input fluid to the output fluid.

In any of the foregoing embodiments, the primary regulation stage is further configured to allow the actual output pressure to change at a first rate in response to the actual output pressure being between a low output pressure threshold and a high output pressure threshold, and the input fluid or the return fluid may flow into the first volume at a second rate that is greater than the first rate in response to the actual output pressure being less than the low output pressure threshold or greater than the high output pressure threshold.

Any of the foregoing embodiments may also include a backup release stage configured to allow the output fluid to flow through the backup release stage to become the return fluid in order to reduce the actual output pressure of the output fluid in response to the actual output pressure being greater than a threshold output pressure.

Any of the foregoing embodiments may also include a recovery stage configured to allow the output fluid to flow through the recovery stage in order to convert the output fluid into the input fluid to conserve hydraulic fluid in the pressure reducer valve in response to a difference between the actual output pressure and the input pressure being greater than a predetermined pressure.

Any of the foregoing embodiments may also include a manual release stage having a release lever configured to allow the output fluid to flow therethrough in response to manual actuation of the release lever and a manual release chamber configured to allow the output fluid to become the return fluid at a metered rate of flow.

Also described is a pressure reducer valve in accordance with various embodiments that can convert an input pressure to a desired output pressure that is less than the input pressure. The pressure reducer valve includes a primary valve having a first volume, a first spring, a second volume, a second spring, and a main shaft. The primary valve is in fluid communication with an input fluid having the input pressure, a return fluid having a return pressure that is less than the input pressure and the desired output pressure, and an output fluid having an actual output pressure. The primary valve is configured to convert at least a portion of the input pressure into the actual output pressure such that the actual output pressure approaches the desired output pressure. The pressure reducer valve further includes a metering valve configured to allow the actual output pressure to change at a first rate in response to the actual output pressure being between a low output pressure threshold and a high output pressure threshold, and the input fluid or the return fluid may flow into the first volume at a second rate that is greater than the first rate in response to the actual output pressure being less than the low output pressure threshold or greater than the high output pressure threshold.

Any of the foregoing embodiments may also include a slow ramp-up stage coupled to the primary valve and configured to reduce a rate of pressure transfer from the input fluid to the output fluid.

Any of the foregoing embodiments may also include a backup release stage configured to allow the output fluid to flow through the backup release stage to become the return fluid in order to reduce the actual output pressure of the output fluid in response to the actual output pressure being greater than a threshold output pressure.

Any of the foregoing embodiments may also include a recovery stage configured to allow the output fluid to flow through the recovery stage in order to convert the output fluid into the input fluid to conserve hydraulic fluid in the pressure reducer valve in response to a difference between the actual output pressure and the input pressure being greater than a predetermined pressure.

Any of the foregoing embodiments may also include a manual release stage having a release lever configured to allow the output fluid to flow therethrough in response to manual actuation of the release lever and a manual release chamber configured to allow the output fluid to become the return fluid at a metered rate of flow.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
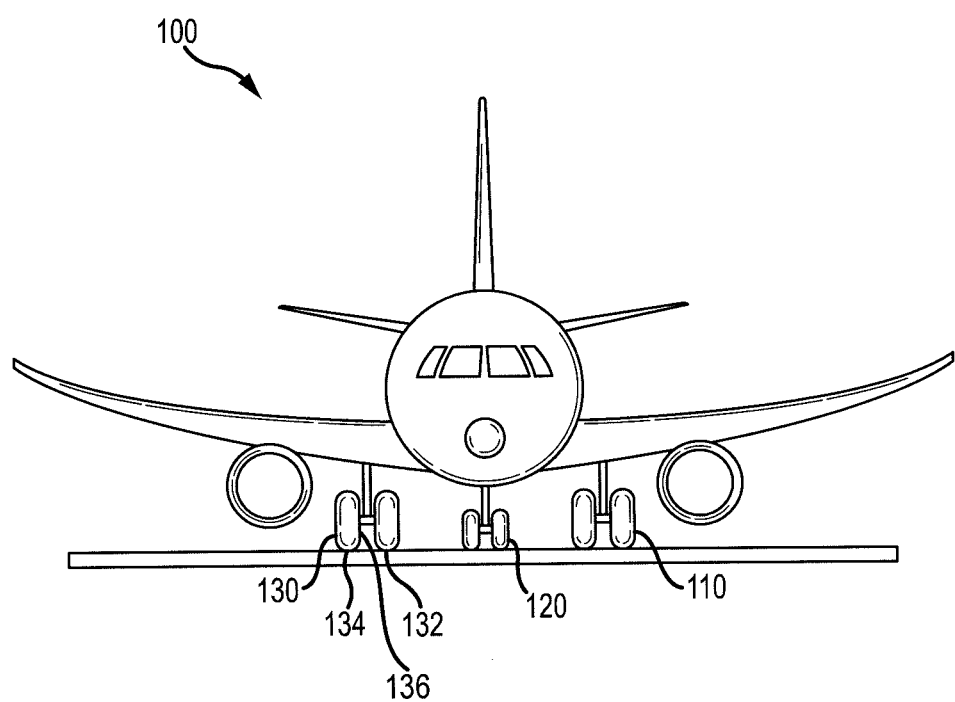
FIG. 1A illustrates an aircraft having multiple landing gear, in accordance with various embodiments.

Referring now to FIG. 1A, an aircraft 100 in accordance with various embodiments can include multiple landing gear including a first landing gear 110, a second landing gear 120, and a third landing gear 130. Each landing gear may include one or more wheel assemblies. For example, the third landing gear 130 includes an inner wheel assembly 132 and an outer wheel assembly 134. Each landing gear 110, 120, 130 and/or each wheel assembly 132, 134 of the aircraft 100 may include an aircraft brake 136. The aircraft brake 136 may include multiple valves for performing various functions. For example, the aircraft brake 136 may include a pressure reducer valve for converting an input pressure to an output pressure that is less than the input pressure.

Figure 1B:
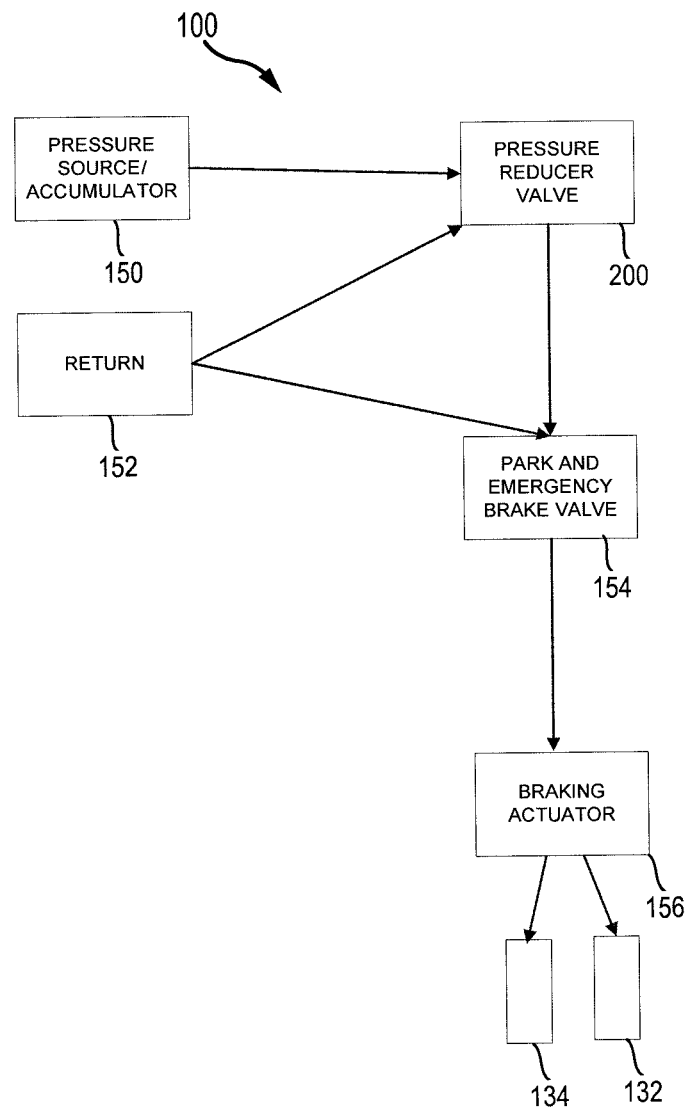
FIG. 1B illustrates a block diagram of an aircraft brake of the aircraft of FIG. 1A, in accordance with various embodiments.

Turning to FIG. 1B, the aircraft 100 may include a hydraulic pressure source or accumulator 150 and a hydraulic return 152. The accumulator 150 may provide pressurized hydraulic fluid to a pressure reducer valve 200. The pressure reducer valve 200 may reduce a pressure of the pressurized fluid from a first pressure value to a second pressure value. The return 152 may provide hydraulic pressure relief to the pressure reducer valve 200 and a park and emergency brake valve 154. The park and emergency brake valve 154 may control a braking actuator 156 which may, for example, compress rotatable discs coupled to each wheel assembly 132, 134. For example, the park and emergency brake valve 154 may apply pressure to the braking actuator 156 to cause the braking actuator 156 to compress the rotatable discs.

Figure 2:
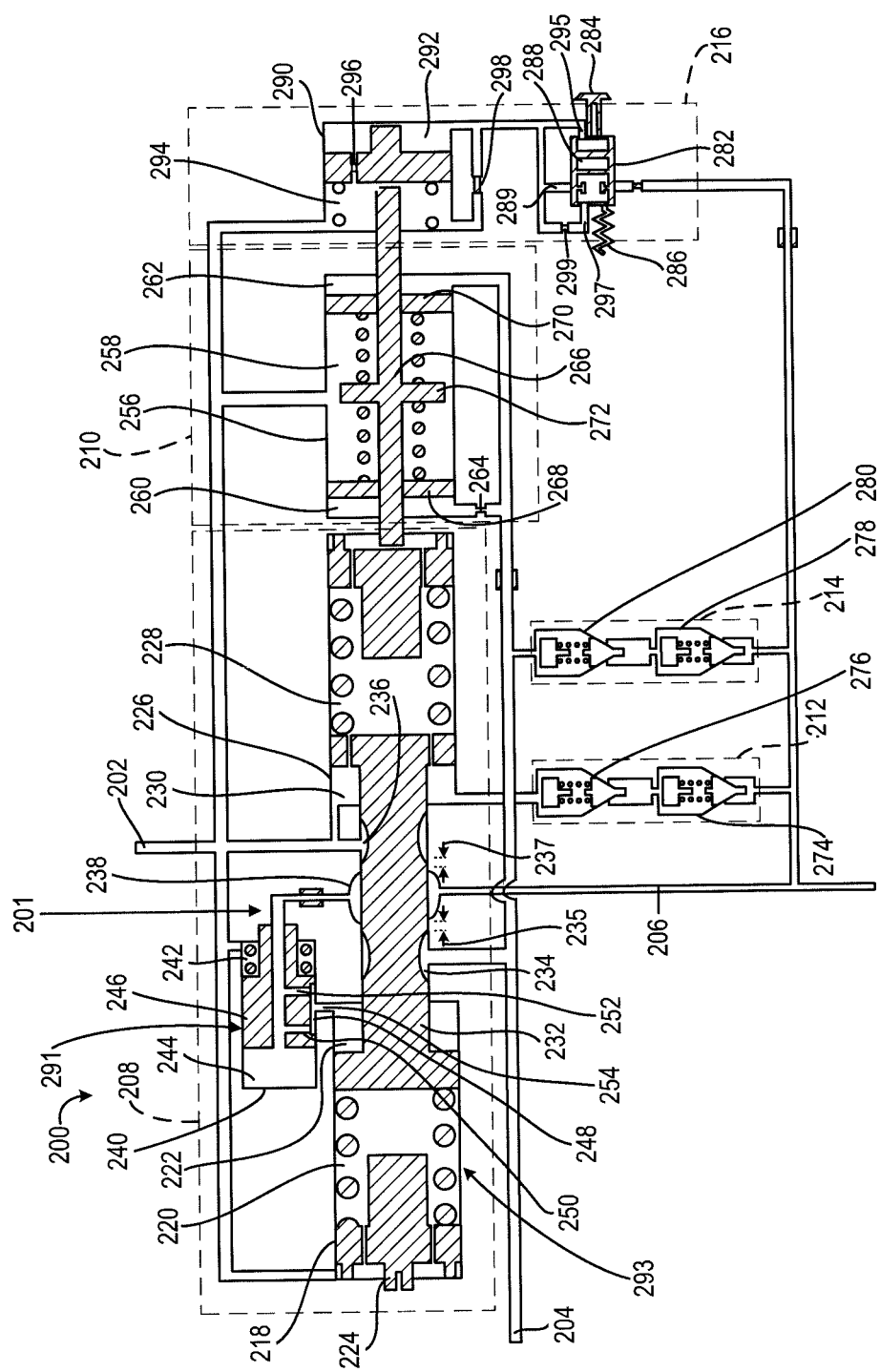
FIG. 2 is a cross-sectional drawing of a pressure reducer valve in accordance with various embodiments.

Turning to FIG. 2, features of a pressure reducer valve 200 according to various embodiments are shown. The pressure reducer valve 200 operates using hydraulic fluid. In particular, the pressure reducer valve 200 may utilize an input fluid 204, a return fluid 202, and an output fluid 206. Each of the input fluid 204, the return fluid 202, and the output fluid 206 may be a hydraulic fluid and may occasionally change between types of fluid. For example, the input fluid 204 may be converted to output fluid 206, the output fluid 206 may be converted to return fluid 202, or the like.

The input fluid 204 may be received from an accumulator and have an input pressure. The output fluid 206 may have an actual output pressure which may be the output of the pressure reducer valve 200. The actual output pressure may be less than the input pressure. The return fluid 202 may have a return pressure which may be less than the input pressure and the actual output pressure. The pressure reducer valve 200 may cause the actual output pressure to be equal to a desired output pressure which may be less than the input pressure. For example, the input pressure may be 5000 pounds per square inch (psi, 34.47 megapascals) and the desired output pressure may be 3000 psi (20.68 megapascals).

The pressure reducer valve 200 may include a primary regulation stage 208, a backup release stage 212, a slow ramp-up stage 210, a recovery stage 214, and a manual release stage 216.

The primary regulation stage 208 may be in fluid communication with the input fluid 204, the return fluid 202, and the output fluid 206. The primary regulation stage 208 may be configured to reduce or convert the input pressure of the input fluid 204 into the desired output pressure of the output fluid 206. Stated differently, the primary regulation stage 208 may cause the actual output pressure of the output fluid 206 to approach the desired output pressure.

Figure 3:
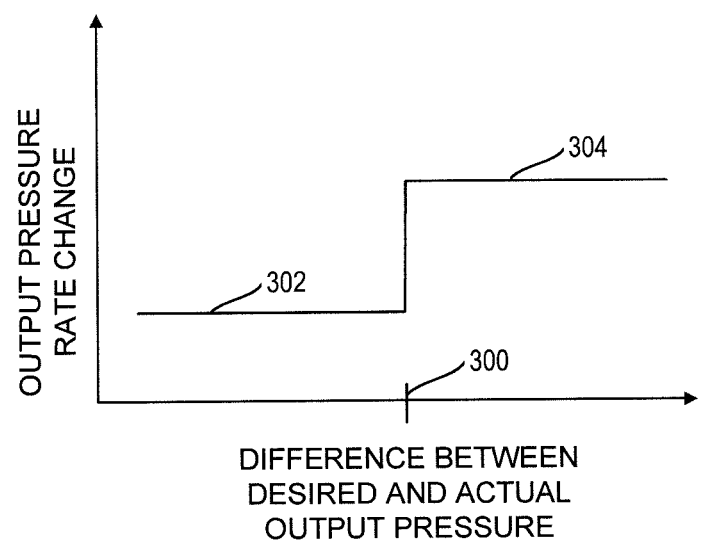
FIG. 3 is a graph illustrating a predetermined threshold pressure and an output pressure rate change of fluid that may flow through a primary regulation stage based on an actual output pressure and a desired output pressure of the pressure reducer valve of FIG. 2.

As will be described in further detail below, the primary regulation stage 208 may be further designed to adjust a rate of change of the actual output pressure based on a difference between the actual output pressure and the desired output pressure. In particular, the primary regulation stage 208 may allow the actual output pressure to change at a first rate in response to the difference between the actual output pressure and the desired output pressure being less than a predetermined threshold pressure (i.e., in response to the actual output pressure being less than or equal to a high output pressure threshold and greater than or equal to a low output pressure threshold), and may allow the actual output pressure to change at a second rate that is greater than the first rate in response to the difference between the actual output pressure and the desired output pressure being greater than the predetermined threshold pressure (i.e., in response to the actual output pressure being greater than or equal to the high output pressure threshold or less than or equal to the low output pressure threshold). Referring briefly to FIG. 3, the rate of change of output pressure is shown to be a first value 302 in response to the difference between the desired and actual output pressure being less than a predetermined threshold pressure 300, and is shown to be a second value 304 in response to the difference between the desired and actual output pressure being greater than the predetermined threshold pressure 300. As shown, the second value 304 is greater than the first value 302.

Returning reference to FIG. 2, the primary regulation stage 208 desirably allows the actual output pressure to increase or decrease towards the desired output pressure relatively quickly in response to the difference between the actual output pressure and the desired output pressure being relatively large, and allows the actual output pressure to increase or decrease towards the desired output pressure relatively gradually in response to the difference being relatively small.

The backup release stage 212 may have one end in fluid communication with the return fluid 202 and another end in fluid communication with the output fluid 206. The backup release stage 212 may allow the output fluid 206 to flow therethrough to become return fluid 202 in response to the actual output pressure being greater than a threshold output pressure. Stated differently, the backup release stage 212 reduces the actual output pressure in response to the actual output pressure being greater than the threshold output pressure. This feature reduces the likelihood of the actual output pressure becoming sufficiently great to damage the pressure reducer valve 200 or to cause other undesirable results in the pressure reducer valve 200 or another component of a corresponding aircraft brake.

The slow ramp-up stage 210 may be coupled to the primary regulation stage 208. The slow ramp-up stage 210 may be designed to reduce a rate at which the pressure from the input fluid transfers to the output fluid. Stated differently, the slow ramp-up stage 210 may reduce a rate of increase of the actual output pressure.

The recovery stage 214 may have a first end in fluid communication with the input fluid 204 and a second end in fluid communication with the output fluid 206. The recovery stage 214 may allow the output fluid 206 to flow therethrough to become input fluid 204 in response to a difference between the actual output pressure and the input pressure being greater than a predetermined pressure. Stated differently, the recovery stage 214 converts the output fluid 206 into the input fluid 204 to conserve hydraulic fluid within the pressure reducer valve 200. Such conservation may increase an amount of time between desired servicing of the accumulator.

The manual release stage 216 may be in fluid communication with the output fluid 206 and the return fluid 202. The manual release stage 216 may include a release lever 282 that allows the output fluid 206 to flow therethrough in response to manual actuation. The manual release stage 216 may further include a manual release chamber 290 that allows the output fluid 206 that flows through the release lever 282 to become return fluid 202. The manual release stage 216 may thus be utilized to reduce an amount of output fluid 206 in the pressure reducer valve 200, for example, for servicing of the pressure reducer valve 200.

Discussing various details of the different stages, the primary regulation stage 208 may include a first chamber 218 having a first spring 220 and a first volume 222. The first volume 222 may be in fluid communication with the output fluid 206. The primary regulation stage 208 may further include a set screw 224 for adjusting the primary regulation stage 208. The primary regulation stage 208 may further include a second chamber 226 having a second spring 228 and a second volume 230. The second volume 230 may be in fluid communication with the return fluid 202.

A main shaft 232 may be at least partially positioned within the first chamber 218 and the second chamber 226. The main shaft 232 may have a first passageway 234 in fluid communication with the input fluid 204, and may also have a second passageway 236 in fluid communication with the return fluid 202.

The primary regulation stage 208 may further include an output passageway 238 in fluid communication with a third chamber 240. The third chamber 240 may include a third spring 242, a third volume 244, and a piston 246 at least partially positioned within the third chamber 240. The third volume 244 may be in fluid communication with the output fluid 206. Hydraulic fluid may flow from the output passageway 238 through the third chamber 240 into the first volume 222 via a first input channel 250 and a second input channel 252, a metering channel 248, and a first volume channel 254.

In order to set the primary regulation stage 208, the output fluid 206 may be set to the desired output pressure. The set screw 224 may be adjusted until the output passageway 238 is positioned between the first passageway 234 and the second passageway 236.

During initial rigging or adjustment of the pressure reducer valve 200, the output fluid 206 may be pressurized to the desired output pressure. The set screw 224 may be initially adjusted until no input fluid 204 flows through the input fluid port and the return fluid port. The set screw 224 may then be further adjusted such that the dead band 235 is biased equally between the passageway 234 and the passageway 238. The set screw 224 may optionally be further adjusted such that the dead band 237 is biased equally between the passageway 238 and the passageway 236.

During operation, the input fluid 204 may be pressurized to the input pressure. In response to the actual output pressure being less than the desired output pressure, the force of the first spring 220 will oppose and overcome the relatively low actual output pressure experienced within the first volume 222 to actuate the main shaft 232 to the right (i.e., towards the second spring 228). In response to this actuation, at least a portion of the first passageway 234 will become aligned with at least a portion of the output passageway 238 allowing the input fluid 204 to flow through the output passageway 238 and become output fluid 206. This conversion of the input fluid 204 to the output fluid 206 increases the actual output pressure of the output fluid 206. As the actual output pressure of the output fluid 206 increases, the pressure within the first volume 222 increases, providing more opposing force to the force of the first spring 220, thus actuating the main shaft 232 back to the left (i.e., towards the set screw 224). In that regard, the first volume 222, the second volume 230, the main shaft 232, the first spring 220, and the second spring 228 may be referred to as a primary valve 293.

In response to the actual output pressure being less than the desired output pressure by at least a threshold pressure (i.e., the actual output pressure being less than the low output pressure threshold), the relatively low actual output pressure experienced in the third volume 244 will allow the third spring 242 to actuate the piston 246 to the left (i.e., towards the set screw 224), thus allowing the second input channel 252 to become aligned with the first volume channel 254. In response to the second input channel 252 being aligned with the first volume channel 254, the input fluid 204 may flow from the first passageway 234 through the output passageway 238 and the third chamber 240 into the first volume 222 at a relatively fast rate. This relatively fast flow rate increases the actual output pressure at a relatively fast rate. As the actual output pressure approaches the desired output pressure, the difference between the actual output pressure and the input pressure will become less than the threshold pressure (i.e., the actual output pressure will become a value between the high output pressure threshold and the low output pressure threshold). In response, the pressure experienced within the third volume 244 will oppose the force of the third spring 242, causing the piston 246 to move to the right (i.e., towards the second spring 228) such that the input fluid 204 flows through the second input channel 252 and the metering channel 248 prior to being received by the first volume 222, causing the input fluid 204 to flow through the metering channel 248 to reduce a rate of flow of fluid into the first volume 222. In that regard, components within the third chamber 240 (i.e., the third volume 244, the third spring 242, the piston 246, the input channels 250, 252, and the metering channel 248) may be referred to as a feedback metering valve 291.

In response to the actual output pressure being greater than the desired output pressure, the relatively great actual output pressure experienced within the first volume 222 will oppose and overcome the force of the first spring 220 to actuate the main shaft 232 to the left. In response to this actuation, at least a portion of the second passageway 236 will become aligned with at least a portion of the output passageway 238, allowing the output fluid 206 to flow through the output passageway 238 and become a return fluid 202. This conversion of the output fluid 206 to the return fluid 202 decreases the actual output pressure of the output fluid 206. As the actual output pressure of the output fluid 206 decreases, the pressure within the first volume 222 decreases, providing less opposing force to the force of the first spring 220, thus actuating the main shaft 232 back to the right (i.e., towards the second spring 228).

In response to the actual output pressure being greater than the desired output pressure by at least a threshold pressure (i.e., the actual output pressure being greater than a high output pressure threshold), the relatively large actual output pressure experienced in the third volume 244 will allow the fluid within the third volume 244 to oppose and overcome the force of the third spring 242, thus actuating the piston 246 to the right (i.e., towards the second spring 228). In that regard, the first input channel 250 may become aligned with the first volume channel 254. In response to the first input channel 250 becoming aligned with the first volume channel 254, the output fluid 206 may flow from the first volume 222 through the third chamber and the output passageway 238 and become return fluid 202 at a relatively fast rate. This relatively fast flow rate decreases the actual output pressure at a relatively fast rate. As the actual output pressure approaches the desired output pressure, the difference between the actual output pressure and the input pressure will become less than the threshold pressure (i.e., the actual output pressure will become a value between the high output pressure threshold and the low output pressure threshold). In response, the pressure experienced within the third volume 244 will reduce, allowing the third spring 242 to actuate the piston 246 to the left (i.e., towards the set screw 224) such that the output fluid 206 flows through the first volume channel 254, the metering channel 248, and the first input channel 250 prior to being received by the output passageway 238. Causing the output fluid 206 to flow through the metering channel 248 reduces a rate of flow of fluid out of the first volume 222.

The ability of the primary regulation stage 208 to change the actual output pressure at a relatively fast rate in response to the actual output pressure being less than the low output pressure threshold or the actual output pressure being greater than the high output pressure threshold, and to change the actual output pressure at a relatively slow rate in response to the actual output pressure being between the low output pressure threshold and the high output pressure threshold provides advantages. For example, the relatively fast rates reduce the likelihood of the actual output pressure spiking too low to too high, while the relatively slow rate allows the primary regulation stage 208 to operate at a bandwidth that is in harmony with other brake control system components such as an anti-skid system.

In response to the pressure reducer valve 200 being in equilibrium (i.e., the actual output pressure remaining relatively constant, stated differently, the output passageway 238 being positioned between the first passageway 234 and the second passageway 236), the actual output pressure may equal the desired output pressure so long as the set screw 224 has been properly adjusted as described above.

In various embodiments, the surfaces of the pressure reducer valve 200 may be lapped. In particular, surfaces of a casing 201 and the main shaft 232 may be lapped to reduce an amount of fluid leakage therebetween.

In various embodiments, a first dead band 235 may be present between the first passageway 234 and the output passageway 238, and a second dead band 237 may be present between the second passageway 236 and the output passageway 238. The dead bands 235, 237 may reduce sensitivity of the primary regulation stage 208. Stated differently, the pressure regulation may not occur unless a significant pressure different exists between the actual output pressure and the desired output pressure, as initially rigged or adjusted by the set screw 224. The dead bands 235, 237 also increase a quality of seal between the main shaft 232 and the casing 201 by providing a relatively large circumferential seal surface.

The backup release stage 212 includes a first release valve 274 and a second release valve 276. In various embodiments, the first release valve 274 and the second release valve 276 may include any type of valve such as a poppet valve. The first release valve 274 is in fluid communication with the output fluid 206 and the second release valve 276. The second release valve 276 is in fluid communication with the first release valve 274 and the return fluid 202. In response to the actual output pressure being greater than a threshold output pressure, the output fluid 206 may cause the first release valve 274 and the second release valve 276 to open, allowing the output fluid 206 to flow therethrough into the second volume 230 and become return fluid 202. Stated differently, in response to the actual output pressure being greater than the threshold output pressure, the output fluid 206 may flow through the first release valve 274 and the second release valve 276, thus reducing the actual output pressure. In that regard, the backup release stage 212 may reduce the likelihood of the actual output pressure becoming too great. Use of the two release valves 274, 276 reduces an amount of leakage through the backup release stage 212.

The slow ramp-up stage 210 includes a ramping chamber 256 having a ramping spring 258, a first ramping volume 260, and a second ramping volume 262 positioned therein. The first ramping volume 260 is designed to receive the input fluid 204 at a first rate, and the second ramping volume 262 is designed to receive the input fluid 204 at a second rate. A metering portion 264 is in fluid communication with the first ramping volume 260 and causes the first rate of flow to be less than the second rate of flow.

A first ramping plate 268 is positioned between the first ramping volume 260 and the ramping spring 258. A second ramping plate 270 is positioned between the second ramping volume 262 and the ramping spring 258. A ramping shaft 266 extends through the first ramping volume 260, the first ramping plate 268, the ramping spring 258, the second ramping plate 270, and the second ramping volume 262. The ramping shaft 266 includes a center plate 272 that couples the ramping shaft 266 to the ramping spring 258. As the input pressure of the input fluid 204 increases, the second ramping volume 262 may have a greater pressure than the first ramping volume 260 due to the metering portion 264. This increased pressure may force the ramping spring 258, and thus the ramping shaft 266, to the left (i.e., towards the set screw 224). In response, the ramping shaft 266 may exert a force on the main shaft 232 to the left (i.e., towards the set screw 224), decreasing a rate of flow of the input fluid 204 through the output passageway 238. After a period of time, the pressure within the first ramping volume 260 may be substantially equal to a pressure within the second ramping volume 262 such that the ramping shaft 266 returns to its original position relative to the ramping chamber 256. Thus, the ramping chamber 256 and components therein reduce a rate of increase of the actual output pressure in response to a rapid increase of the input pressure.

The recovery stage 214 is designed to conserve fluid within the pressure reducer valve 200. In particular, in response to the input pressure being relatively low (such as when the corresponding aircraft brake is turned off), the recovery stage 214 allows the output fluid 206 to be converted to input fluid 204 instead of return fluid 202.

The recovery stage 214 includes a first recovery valve 278 and a second recovery valve 280. In various embodiments, the first recovery valve 278 and the second recovery valve 280 may include any type of valve such as a poppet valve. The first recovery valve 278 is in fluid communication with the output fluid 206 and the second recovery valve 280. The second recovery valve 280 is in fluid communication with the first recovery valve 278 and the input fluid 204. In response to a difference between the actual output pressure and the input pressure being greater than a predetermined pressure, the output fluid 206 may cause the first recovery valve 278 and the second recovery valve 280 to open, allowing the output fluid 206 to flow therethrough and become input fluid 204. In various embodiments, the first recovery valve 278 and the second recovery valve 280 may allow fluid to flow only in response to the actual output pressure being greater than the input pressure. Stated differently, in response to the actual output pressure being greater than the input pressure, the output fluid 206 may flow through the recovery valves 278, 280 and become input fluid 204, thus increasing an amount of input fluid 204 within the pressure reducer valve 200.

The recovery stage 214 allows recovery of regenerated hydraulic energy. Hydraulic regeneration occurs in response to loads being energized by means other than the normal input means, such as a thermally flexing brake structure. In that regard, in response to the actual output pressure being greater than the input pressure, the hydraulic fluid (i.e., the output fluid 206) may return to the input side (i.e., become input fluid 204). This provides advantages such as allowing a hydraulic accumulator to remain energized for a greater period of time than when no recovery stage is included.

The manual release stage 216 may include a release lever 282 and a corresponding actuation handle 284 and release spring 286. The release lever 282 may be in fluid communication with the output fluid 206 and a manual release chamber 290. In response to a depression of the actuation handle 284, the force of the spring of 286 may be overcome, allowing a connection tube 288 of the release lever 282 to form a fluid connection between the output fluid 206 and the manual release chamber 290 via a manual output tube 289.

The release lever 282 may be designed such that in response to depression of the actuation handle 284, the connection tube 288 remains in fluid communication with the output fluid 206 and the manual release chamber 290 for a predetermined period of time even if the actuation handle 284 is released. This occurs due to hydraulic pressure applied to the actuation handle 284 via a latch port 295. Gradually, the hydraulic fluid received via the latch port 295 may flow through an unlatch port 297 and a restrictor orifice 299, allowing the actuation handle 284 to return to its pre-actuation stage. At this point, hydraulic fluid may cease flowing through the release lever 282.

This allows an operator using the release lever 282 to depress the actuation handle 284 to begin release of the output fluid 206 and then to release the actuation handle 284 such that the output fluid 206 continues to flow through the release lever 282 after release of the actuation handle 284. This is advantageous because the output fluid 206 may be released without an operator continuously holding the actuation handle 284.

In response to the output fluid 206 flowing through the release lever 282, the output fluid 206 may be received by the manual release chamber 290 and, in particular, an output volume 292. The manual release chamber 290 may further include a return volume 294. A first metering channel 296 and a second metering channel 298 may allow the output fluid 206 to flow from the output volume 292 into the return volume 294, where it is considered return fluid 202. The first metering channel 296 and the second metering channel 298 limit the rate of flow between the output volume 292 and the return volume 294. In that regard, the rate of flow of output fluid 206 through the manual release chamber 290 is limited by the first metering channel 296 and the second metering channel 298.

The manual release stage 216 may be utilized in order to reduce an amount of output fluid 206 within the pressure reducer valve 200. For example, it may be desirable to reduce the output fluid 206 within the pressure reducer valve 200 during servicing of the pressure reducer valve 200 or the corresponding aircraft brake.

In various embodiments, it may be desirable to use a second pressure reducer valve downstream from the pressure reducer valve 200. In that regard, it may be desirable for only one of the pressure reducer valves to include the features of the pressure reducer valve 200 and the other pressure reducer valve to include fewer features, making the other valve a conventional valve. Two different pressure reducer valves may be desirable compared to two of the same pressure reducer valves that may counteract each other resulting in undesirable effects.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is proposed to be claimed is:

1. A pressure reducer valve for converting an input pressure to a desired output pressure that is less than the input pressure, the pressure reducer valve comprising:
   a first chamber having a first spring and a first volume for receiving an output fluid having an actual output pressure that equals the desired output pressure in response to the pressure reducer valve achieving equilibrium;
   a second chamber having a second spring and a second volume for receiving a return fluid having a return pressure that is less than the desired output pressure and the input pressure of an input fluid; and
   a main shaft exposed to the first spring and the output fluid from the first chamber and the second spring and the return fluid from the second chamber such that the main shaft may move relative to the first chamber and the second chamber based on forces applied by the first spring, the output fluid, the second spring, and the return fluid, wherein:
      the main shaft further includes a first passageway configured to be in fluid communication with the input fluid and a second passageway configured to be in fluid communication with the return fluid,
      the main shaft is configured to move relative to the first chamber and the second chamber to allow the first volume to receive at least a portion of the input fluid to increase the actual output pressure in response to the actual output pressure being less than the desired output pressure, and
      the main shaft is configured to move relative to the first chamber and the second chamber to allow the second volume to receive at least a portion of the output fluid to decrease the actual output pressure in response to the actual output pressure being greater than the desired output pressure;
   a third chamber having a third spring and a third volume for receiving the output fluid;
   a piston at least partially positioned within the third chamber and subjected to the third spring and the output fluid such that the input fluid or the return fluid may flow into the first volume at a first rate in response to the actual output pressure being between a first output pressure threshold and a second output pressure threshold, and the input fluid or the return fluid may flow into the first volume at a second rate that is greater than the first rate in response to the actual output pressure being less than the first output pressure threshold or greater than the second output pressure threshold;
   a ramping chamber having a ramping spring, a first ramping volume configured to receive the input fluid at a first flow rate, and a second ramping volume configured to receive the input fluid at a second flow rate that is greater than the first flow rate; and
   a ramping shaft at least partially positioned within the ramping chamber, coupled to the second spring, and subjected to pressure from the first ramping volume, the second ramping volume, and the ramping spring such that the ramping shaft actuates the main shaft to reduce a rate of input fluid flow into the first volume in response to a predetermined increase of the input pressure.

2. The pressure reducer valve of claim 1, further comprising a first ramping plate positioned on a first side of the ramping spring and a second ramping plate positioned on a second side of the ramping spring, wherein:
   the first ramping plate is exposed to the first ramping volume;
   the second ramping plate is exposed to the second ramping volume; and
   the ramping shaft includes a center plate positioned along and coupled to the ramping spring such that the ramping shaft is subjected to the pressure from the first ramping volume via the first ramping plate and the ramping spring, and is subjected to the pressure from the second ramping volume via the second ramping plate and the ramping spring.

3. The pressure reducer valve of claim 1, further comprising a backup release stage configured to allow the output fluid to flow through the backup release stage to the second volume to be the return fluid in order to reduce the actual output pressure of the output fluid in response to the actual output pressure being greater than a threshold output pressure.

4. The pressure reducer valve of claim 3, wherein the backup release stage includes a first release valve and a second release valve, the first release valve being in fluid communication with the output fluid and the second release valve, and the second release valve being in fluid communication with the first release valve and the second volume such that the output fluid may flow through the first release valve and the second release valve to the second volume in response to the actual output pressure being greater than the threshold output pressure.

5. The pressure reducer valve of claim 1, further comprising a recovery stage configured to allow the output fluid to flow through the recovery stage in order to convert the output fluid into the input fluid to conserve hydraulic fluid in the pressure reducer valve in response to a difference between the actual output pressure and the input pressure being greater than a predetermined pressure.

6. The pressure reducer valve of claim 5, wherein the recovery stage includes a first recovery valve and a second recovery valve, the first recovery valve being in fluid communication with the output fluid and the second recovery valve, and the second recovery valve being in fluid communication with the first recovery valve and the input fluid such that the output fluid may flow through the first recovery valve and the second recovery valve in order to convert the output fluid into the input fluid in response to the difference between the actual output pressure and the input pressure being greater than the predetermined pressure.

7. The pressure reducer valve of claim 1, further comprising a manual release stage having a release lever configured to allow the output fluid to flow therethrough in response to manual actuation of the release lever and a manual release chamber having:
   an output volume configured to be in fluid communication with the output fluid in response to the manual actuation of the release lever;

a return volume in fluid communication with the return fluid; and a first metering channel and a second metering channel each extending from the output volume to the return volume and configured to allow the output fluid to flow to the return volume in order to become the return fluid at a metered rate of flow.

8. A pressure reducer valve for converting an input pressure to a desired output pressure that is less than the input pressure, the pressure reducer valve comprising:

a primary regulation stage in fluid communication with an input fluid having the input pressure, a return fluid having a return pressure that is less than the input pressure and the desired output pressure, and an output fluid having an actual output pressure and configured to convert at least a portion of the input pressure into the actual output pressure such that the actual output pressure approaches the desired output pressure;

a ramp-up stage coupled to the primary regulation stage and configured to reduce a rate of pressure transfer from the input fluid to the output fluid; and a recovery stage configured to allow the output fluid to flow through the recovery stage in order to convert the output fluid into the input fluid to conserve hydraulic fluid in the pressure reducer valve in response to a difference between the actual output pressure and the input pressure being greater than a predetermined pressure, wherein the recovery stage includes a first recovery valve and a second recovery valve, the first recovery valve being in fluid communication with the output fluid and the second recovery valve, and the second recovery valve being in fluid communication with the first recovery valve and the input fluid such that the output fluid may flow through the first recovery valve and the second recovery valve in order to convert the output fluid into the input fluid in response to the difference between the actual output pressure and the input pressure being greater than the predetermined pressure.

9. The pressure reducer valve of claim 8, wherein the primary regulation stage is further configured to allow the actual output pressure to change at a first rate in response to the actual output pressure being between a first output pressure threshold and a second output pressure threshold, and to change at a second rate that is greater than the first rate in response to the actual output pressure being less than the first output pressure threshold or greater than the second output pressure threshold.

10. The pressure reducer valve of claim 8, further comprising a backup release stage configured to allow the output fluid to flow through the backup release stage to become the return fluid in order to reduce the actual output pressure of the output fluid in response to the actual output pressure being greater than a threshold output pressure.

11. The pressure reducer valve of claim 8, further comprising a manual release stage having a release lever configured to allow the output fluid to flow therethrough in response to manual actuation of the release lever and a manual release chamber configured to allow the output fluid to become the return fluid at a metered rate of flow.

12. A pressure reducer valve for converting an input pressure to a desired output pressure that is less than the input pressure, the pressure reducer valve comprising:

a primary valve:
having a first volume, a first spring, a second volume, a second spring, and a main shaft,
being in fluid communication with an input fluid having the input pressure, a return fluid having a return pressure that is less than the input pressure and the desired output pressure, and an output fluid having an actual output pressure, and
configured to convert at least a portion of the input pressure into the actual output pressure such that the actual output pressure approaches the desired output pressure;

a metering valve having a third volume, a third spring, and a piston and configured to allow the actual output pressure to change at a first rate in response to the actual output pressure being between a first output pressure threshold and a second output pressure threshold, and the input fluid or the return fluid may flow into the first volume at a second rate that is greater than the first rate in response to the actual output pressure being less than the first output pressure threshold or greater than the second output pressure threshold; and a recovery stage configured to allow the output fluid to flow through the recovery stage in order to convert the output fluid into the input fluid to conserve hydraulic fluid in the pressure reducer valve in response to a difference between the actual output pressure and the input pressure being greater than a predetermined pressure wherein the recovery stage includes a first recovery valve and a second recovery valve, the first recovery valve being in fluid communication with the output fluid and the second recovery valve, and the second recovery valve being in fluid communication with the first recovery valve and the input fluid such that the output fluid may flow through the first recovery valve and the second recovery valve in order to convert the output fluid into the input fluid in response to the difference between the actual output pressure and the input pressure being greater than the predetermined pressure.

13. The pressure reducer valve of claim 12, further comprising a ramp-up stage coupled to the primary valve and configured to reduce a rate of pressure transfer from the input fluid to the output fluid.

14. The pressure reducer valve of claim 12, further comprising a backup release stage configured to allow the output fluid to flow through the backup release stage to become the return fluid in order to reduce the actual output pressure of the output fluid in response to the actual output pressure being greater than a threshold output pressure.

15. The pressure reducer valve of claim 12, further comprising a manual release stage having a release lever configured to allow the output fluid to flow therethrough in response to manual actuation of the release lever and a manual release chamber configured to allow the output fluid to become the return fluid at a metered rate of flow.

* * * * *